US012486526B2

(12) United States Patent
Schroeder (10) Patent No.: US 12,486,526 B2
(45) Date of Patent: Dec. 2, 2025

(54) SURROGATE VIRUS ASSAYS AND METHODS

(71) Applicant: REGENTS OF THE UNIVERSITY OF MINNESOTA, Minneapolis, MN (US)

(72) Inventor: Declan Cosmo Schroeder, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 1013 days.

(21) Appl. No.: 17/619,220

(22) PCT Filed: Jun. 23, 2020

(86) PCT No.: PCT/US2020/039072
§ 371 (c)(1),
(2) Date: Dec. 14, 2021

(87) PCT Pub. No.: WO2020/263788
PCT Pub. Date: Dec. 30, 2020

(65) Prior Publication Data
US 2022/0235393 A1    Jul. 28, 2022

Related U.S. Application Data

(60) Provisional application No. 62/865,404, filed on Jun. 24, 2019.

(51) Int. Cl.
  *C12Q 1/22*    (2006.01)
  *A23K 30/00*   (2016.01)
  *A23K 50/30*   (2016.01)
  *C12Q 1/70*    (2006.01)

(52) U.S. Cl.
  CPC .............. *C12Q 1/22* (2013.01); *A23K 30/00* (2016.05); *A23K 50/30* (2016.05); *C12Q 1/70* (2013.01)

(58) Field of Classification Search
None
See application file for complete search history.

(56) References Cited

U.S. PATENT DOCUMENTS

| 2019/0153504 A1 | 5/2019 | Alvarez Martin et al. |
| 2020/0221730 A1* | 7/2020 | Niederwerder ........ A01K 67/02 |

FOREIGN PATENT DOCUMENTS

| WO | 2019/169256 | 9/2019 |
| WO | 2020/263788 | 12/2020 |
| WO | 2023/043895 | 3/2023 |

OTHER PUBLICATIONS

Palowski et al., Frontiers in Microbiology, 2022, 13:1059118. (Year: 2022).*
University of Minnesota, "U of M researchers lead major African swine fever breakthrough", umnswinenews, May 26, 2023. (Year: 2023).*
International Application No. PCT/US2022/043622, filed Sep. 15, 2022; International Preliminary Report on Patentability issued Mar. 5, 2024; 5 pages.
International Preliminary Report on Patentability from PCT Application No. PCT/US2020/039072 dated Jan. 6, 2022, 7 pages.
International Search Report and Written Opinion from PCT Application No. PCT/US2020/039072 dated Sep. 30, 2020, 9 pages.
Zhou et al., Emergence of African Swine Fever in China, 2018. Transbound Emerg Dis 65, 1482-1484 (2018).
Yutin et al., Origin of giant viruses from smaller DNA viruses not from a fourth domain of cellular life. Virology 466-467, 38-52 (2014).
Wilson et al., Complete genome sequence and lytic phase transcription profile of a Coccolithovirus. Science 309, 1090-1092 (2005).
Wilson et al., Isolation of viruses responsible for the demise of an Emiliania huxleyi bloom in the English Channel. Journal of the Marine Biological Association of the UK 82, 369-377 (2002).
Vo et al., Development of a test system to evaluate procedures for decontamination of respirators containing viral droplets. Appl Environ Microbiol 75, 7303-7309 (2009).
Turner et al., Laboratory-scale inactivation of African swine fever virus and swine vesicular disease virus in pig slurry. J Appl Microbiol 87, 148-157 (1999).
Trudeau et al., Comparison of Thermal and Non-Thermal Processing of Swine Feed and the Use of Selected Feed Additives on Inactivation of Porcine Epidemic Diarrhea Virus (PEDV). PLoS One 11, e0158128 (2016).
Seo et al., Effect of temperature, pH, and NaCl on the inactivation kinetics of murine norovirus. J Food Prot 75, 533-540 (2012).
Schulz, "It Takes a Team to Keep FADs at Bay" National Hog Farmer, 7 pages (Oct. 26, 2016). Retrieved on the Internet at nationalhogfarmer.com/print/14871 on Sep. 8, 2020.
Schroeder et al., Genomic analysis of the smallest giant virus—*Feldmannia* sp. virus 158. Virology 384, 223-232 (2009).
Schroeder et al., Coccolithovirus (Phycodnaviridae): characterisation of a new large dsDNA algal virus that infects Emiliana huxleyi. Arch Virol 147, 1685-1698 (2002).
Sanchez et al., African swine fever virus uses macropinocytosis to enter host cells. PLoS Pathog 8, e1002754 (2012).
Ogata et al., Remarkable sequence similarity between the dinoflagellate-infecting marine girus and the terrestrial pathogen African swine fever virus. Virol J 6, 178 (2009).

(Continued)

*Primary Examiner* — Nicole Kinsey White
(74) *Attorney, Agent, or Firm* — Mueting Raasch Group (57) ABSTRACT

A method for monitoring the presence or absence of a megavirus in animal feed, an animal feed ingredient, or an animal product uses a surrogate virus assay. The surrogate virus assay generally includes, inoculating the animal feed, animal feed ingredient, or animal product with a surrogate virus as a proxy for the megavirus, subjecting the animal feed, animal feed ingredient, or animal product to a treatment that inactivates the megavirus and the surrogate virus, waiting a predetermined period of time, and determining the presence or absence of the surrogate virus in the animal feed, animal feed ingredient, or animal product, thereby monitoring the presence or absence of the megavirus in the animal feed, animal feed ingredient, or animal product.

14 Claims, 4 Drawing Sheets

(56) References Cited

OTHER PUBLICATIONS

Mackinder et al., A unicellular algal virus, Emiliania huxleyi virus 86, exploits an animal-like infection strategy. J Gen Virol 90, 2306-2316 (2009).
Li et al., African swine fever in China. Vet Rec 183, 300-301 (2018).
Krug et al., Chemical disinfection of high-consequence transboundary animal disease viruses on nonporous surfaces. Biologicals 39, 231-235 (2011).
Krug et al., Disinfection of foot-and-mouth disease and African swine fever viruses with citric acid and sodium hypochlorite on birch wood carriers. Vet Microbiol 156, 96-101 (2012).
Knight et al., Thermal Inactivation of Animal Virus Pathogens, Current Topics in Virology, 11(4): 103-199 (Apr. 1, 2013).
Kalmar et al., Sensitivity of African swine fever virus (ASFV) to heat, alkalinity and peroxide treatment in presence or absence of porcine plasma. Vet Microbiol 219, 144-149 (2018).
Hermann et al., Effect of temperature and relative humidity on the stability of infectious porcine reproductive and respiratory syndrome virus in aerosols. Vet Res 38, 81-93 (2007).
Alonso et al., Family: Asfarviridae. Harrach and Davison (Eds.), Virus Taxonomy, VIIIth Report of the ICTV, Elsevier/Academic Press, London (2018) 26 pages. Retrieved online on Apr. 22, 2023 at ictv.global/report/chapter/asfarviridae/asfarviridae.
Dee et al., Survival of viral pathogens in animal feed ingredients under transboundary shipping models. PLoS One 13, e0194509 (2018).
Dee et al., An evaluation of contaminated complete feed as a vehicle for porcine epidemic diarrhea virus infection of naïve pigs following consumption via natural feeding behavior: proof of concept. BMC Veterinary Research 10, 176 (2014).
Colson et al., "Megavirales", a proposed new order for eukaryotic nucleocytoplasmic large DNA viruses. Arch Virol 158, 2517-2521 (2013).
Chen et al., Isolation and characterization of porcine epidemic diarrhea viruses associated with the 2013 disease outbreak among swine in the United States. J Clin Microbiol 52, 234-243 (2014).
Backstrom et al., Virus Genomes from Deep Sea Sediments Expand the Ocean Megavirome and Support Independent Origins of Viral Gigantism. mBio 10, (2019).
International Search Report and Written Opinion from PCT Application No. PCT/US2022/043622 dated Dec. 15, 2022, 8 pages.
Dixon et al., Asfarviridae. C.M. Fauquet, M.A. Mayo, J. Maniloff, U. Desselberger, L.A. Ball (Eds.), Virus Taxonomy, VIIIth Report of the ICTV, Elsevier/Academic Press, London (2005), pp. 135-143.

\* cited by examiner

Batch lysis          Virus Concentration

FIG. 4B

Spike complete fee       Kill data (growth inhibition)       Kill curves

FIG. 4C

Mechanistic analysis

FIG. 4D

Spike Pilot Scale        Kill data (growth inhibition)        Kill curves

SURROGATE VIRUS ASSAYS AND METHODS

CROSS-REFERENCE TO RELATED APPLICATION

This application is the § 371 U.S. National Stage of International Application No. PCT/US2020/039072, filed Jun. 23, 2020, which claims the benefit of U.S. Provisional Patent Application No. 62/865,404 filed Jun. 24, 2019, each of which is incorporated herein by reference in its entirety.

SUMMARY

This disclosure describes, in one aspect, a method for monitoring the presence or absence of a megavirus in animal feed or an animal feed ingredient. Generally, the method includes inoculating the animal feed or animal feed ingredient with a surrogate virus as a proxy for the megavirus, subjecting the animal feed or animal feed ingredient to a treatment that inactivates the megavirus and the surrogate virus, waiting a predetermined period of time, and determining the presence or absence of the surrogate virus in the animal feed or animal feed ingredient, thereby monitoring the presence or absence of the megavirus in the animal feed or animal feed ingredient.

In some embodiments, the megavirus is African swine fever virus (ASFV) and the surrogate virus is an ASFV surrogate virus. In some of these embodiments, the ASFV surrogate virus can be a *Coccolithovirus* such as, for example, *Emiliania huxleyi* virus.

In some embodiments, the treatment that inactivates ASFV and the ASFV surrogate virus includes exposure to a temperature of at least 65° C. for at least one minute, exposure to a temperature of at least 85° C. for at least one second, exposure to citric acid, or exposure to increased salinity.

In some embodiments, the predetermined period of time includes transportation of the animal feed or animal feed ingredient from a supplier to a user. In other embodiments, the predetermined period of time includes storage of the animal feed or animal feed ingredient prior to use.

In some embodiments, the method further includes determining that the animal feed or animal feed ingredient is safe for livestock if no surrogate virus is detected.

In some embodiments, the method further includes determining that the treatment is effective to inactivate the megavirus for the predetermined period of time if no megavirus surrogate virus is detected.

In another aspect, this disclosure describes a method for monitoring the presence or absence of a megavirus in an animal product. Generally, the method includes inoculating the animal product with a surrogate virus as a proxy for the megavirus, subjecting the animal product to a treatment that inactivates the megavirus and the surrogate virus, waiting a predetermined period of time, and determining the presence or absence of the surrogate virus in the animal product, thereby monitoring the presence or absence of the megavirus in the animal product.

The above summary is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 2. Electron micrographs of *Emiliania huxleyi* virus (EhV) and African swine fever virus (ASFV). (A) EhV, bar=170 nm. (B) ASFV, bar=50 nm.

FIG. 4. Experimental flow chart illustrating aspects of the development of the RISNA assay. (A) Image of a typical batch lysis event of the alga *Emiliania huxleyi* 96 hours after the addition of surrogate virus, EhV, versus uninfected control, followed by an optional method of virus concentration using a cross-flow filtration device. (B) Complete feed is spiked with surrogate virus from batch lysate or concentrate, kill data/growth inhibition data through cell counting or microscopy or PCR or flow cytometry is measured, virus data through microscopy or PCR or plaque assay or flow cytometry is measured and kill curves are generated from the kill data/growth inhibition data/virus data. (C) Mechanistic analysis using microscopy or 'omics' technologies or flow cytometry for infection dynamic assessments. (D) Scale up of monitoring: Complete feed or feed ingredient is spiked with surrogate virus for kill data/growth inhibition and virus data collection, and kill curves are generated from a pilot or large-scale plant setting.

DETAILED DESCRIPTION OF ILLUSTRATIVE EMBODIMENTS

This disclosure describes an assay for monitoring the presence or absence of a megavirus in animal feed, an animal feed ingredient, or an animal product. The assay can be used as a surveillance tool to determine whether a particular unit of animal feed, animal feed ingredient, or animal product is free of megavirus and therefore safe to provide to livestock. The assay also can be used to determine whether a particular virus-inactivating treatment is effective for inactivating a megavirus for a predetermined period of time.

Megavirus outbreaks can have significant economic effects on livestock industries. Viruses that survive in feed ingredients is a route of viral transmission with increased importance with global trade. Current literature and practice fails to effectively evaluate the most effective method for eradicating megaviruses in feed.

The assay described herein is a risk-free in situ non-animal (RISNA) megavirus surrogate model assay that can be performed to reduce the risk of transmitting megaviruses in animal feed or animal feed ingredients in the supply chain. In addition, or alternatively, one can use the surrogate megavirus model assay to characterize the effectiveness of treatment—i.e., determine which virus-inactivating treatment is effective to inactivate a particular megavirus under predetermined conditions. For example, the assay allows one to reduce and/or eliminate African swine fever virus (ASFV) at the feed mill before complete feed is distributed (locally, nationally, or internationally) and provides the industry with a surveillance tool for the effective monitoring of megaviruses in complete feed after, for example, transport and/or storage.

In some exemplary embodiments, the megavirus being monitored using the surrogate assay is African swine fever virus (ASFV). While described below in the context of an exemplary embodiment in which megavirus being monitored is ASFV, the assay method described herein can be used to monitor other megaviruses. Exemplary alternative megaviruses that can be monitored using the assay include, for example, Members of the families Poxviridae, Mimiviridae, Marseilleviridae, Iridoviridae, and other dsDNA viruses—e.g., members of the family Herpesviridae. While poxviruses have somewhat different morphology, the surrogate assay may still be used to effectively monitor dsDNA genome degradation in the poxviruses.

ASFV is a complex enveloped virus that belongs to a group of megaviruses that replicate completely or partly in the cytoplasm of eukaryotic cells. African swine fever is a highly contagious disease manifesting clinical symptoms of hemorrhagic fever caused by ASFV and leading to almost 100% mortality in domestic pigs. Infected pigs typically die within one month after the first clinical signs appear.

Figure 1:
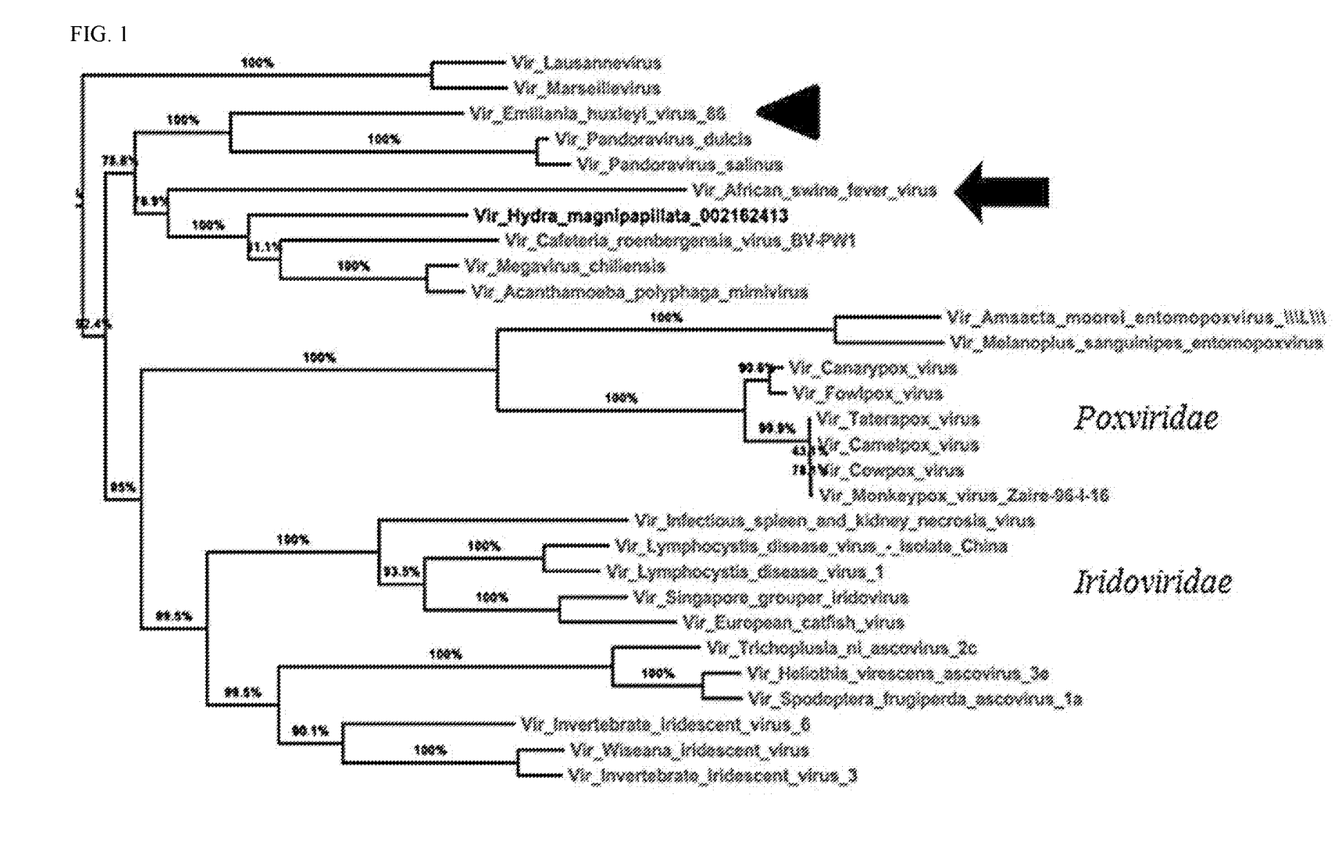
FIG. 1. Phylogeny showing *Emiliania huxleyi* virus (EhV arrowhead) and African swine fever virus (ASFV, arrow) embedded within a megavirus clade. Each is located outside of the families Poxviridae and Iridoviridae.

African swine fever virus, family Asfarviridae belongs to a group of viruses known as nucleocytoplasmic large dsDNA viruses (NCLDVs) or megaviruses (FIG. 1) that replicate completely or partly in the cytoplasm of eukaryotic cells. Megaviruses are a diverse group of viruses that include seven families: Ascoviridae, Asfarviridae, Iridoviridae, Marseilleviridae, Mimiviridae, Phycodnaviridae, and Poxviridae. Megaviruses are united by sharing at least five conserved core genes. ASFV shares a similar icosahedral morphology with members of the family Iridoviridae and does not resemble the brick-shaped poxviruses (Poxviridae). ASFV does not fit well into any of the animal-related megavirus families (FIG. 1)—i.e., megaviruses that infect animals.

ASFV is the only member of the genus Asfarviridae, but it shares many similarities with a non-animal member of the megaviruses, *Emiliania huxleyi* virus (EhV). The similarities between ASFV and EhV make EhV an effective surrogate for ASFV in embodiments of the assay that are designed to monitor ASFV.

Figure 2A:
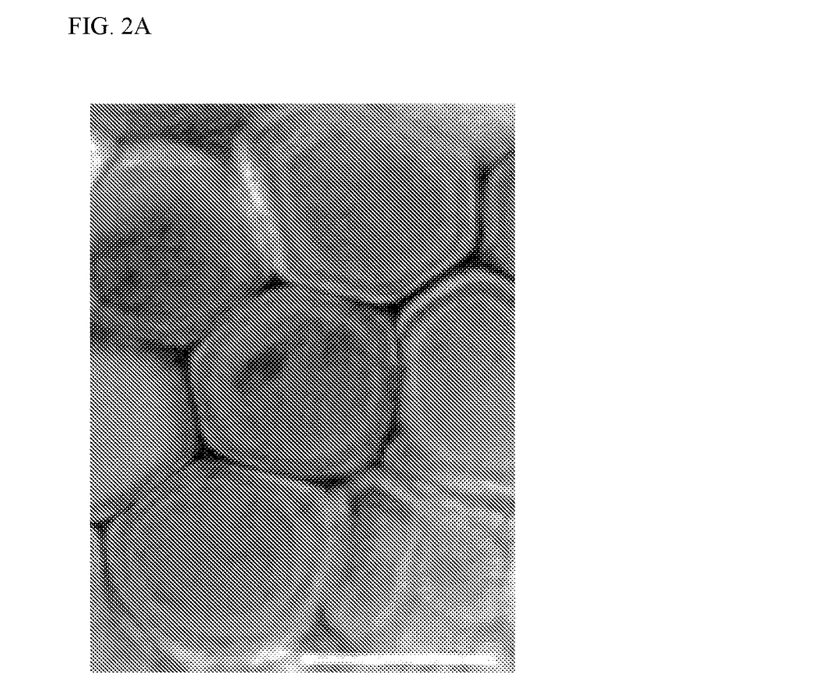
Figure 2B:
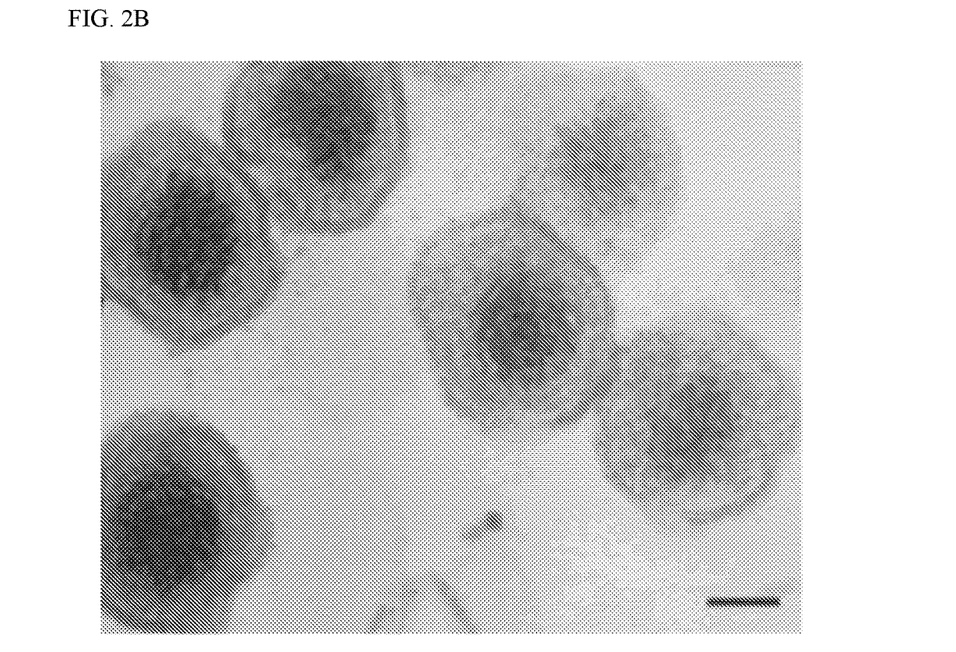

EhV is an algal virus in the family Phycodnaviridae, that natively infects its oceanic host *Emiliania huxleyi*. *E. huxleyi* is a marine unicellular phytoplankton, which can form vast oceanic blooms at temperate latitudes and is a component of global biogeochemical cycles. While ASFV and EhV are only distantly genetically related, they morphometrically similar (FIG. 2). The ASFV virion consists of a nucleoprotein core structure, 70-100 nm in diameter, surrounded by an icosahedral capsid, 170 to 190 nm in diameter, and an external lipid-containing envelope. The EhV virion consists of a nucleoprotein core structure, 70-100 nm in diameter, surrounded by an icosahedral capsid, 170 to 190 nm in diameter, and an external lipid-containing envelope. Moreover, EhV (genus *Coccolithovirus*) infection and release mechanisms are novel for algal viruses (phycodnaviruses), with viral entry, internal processes, and exit having greater similarities to other family members of the NCLDV group (e.g., Asfarviridae) than to members of its own family.

Figure 3:
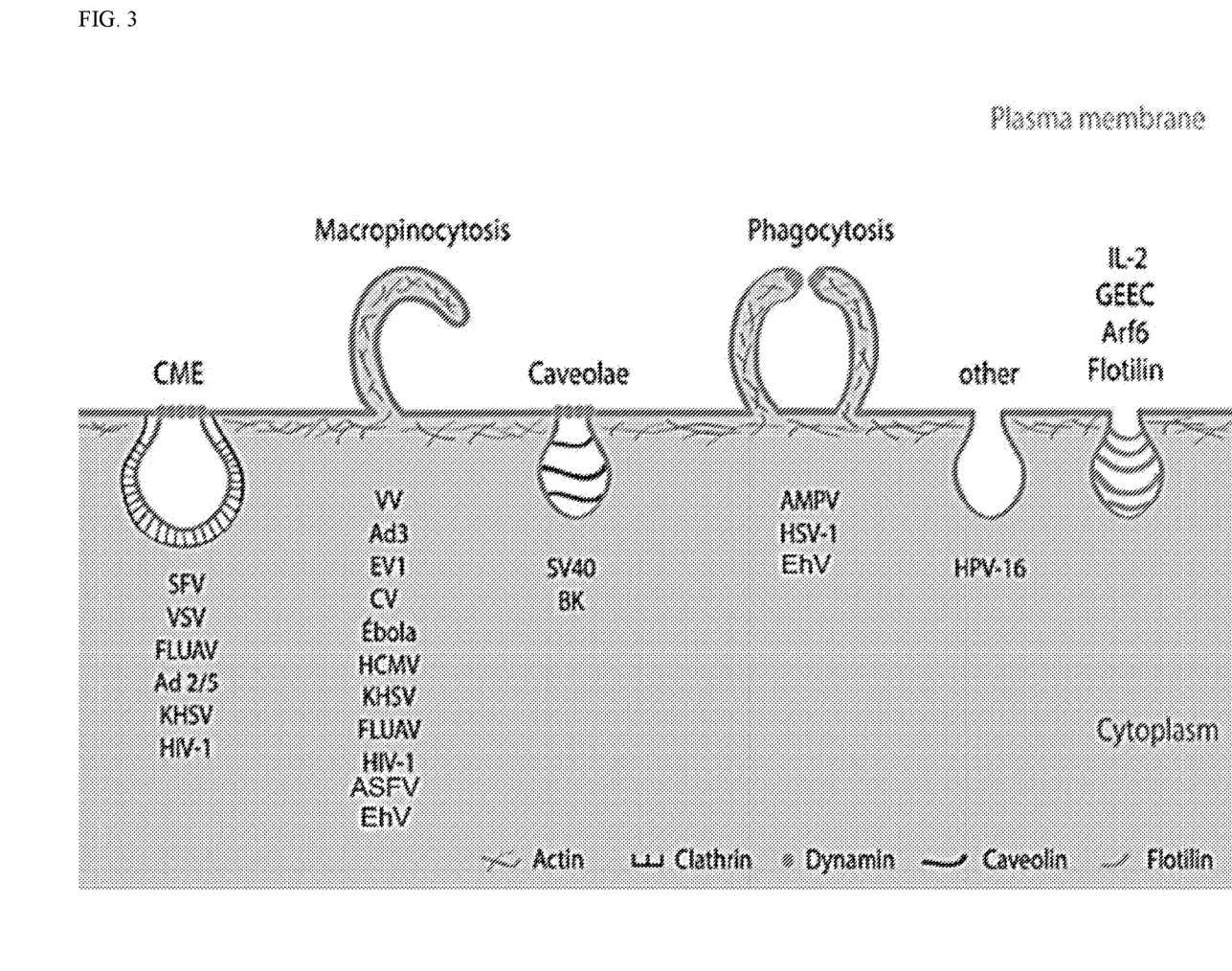
FIG. 3. Endocytotic mechanisms used by animal viruses.

ASFV and EhV enter and exit their cellular hosts by similar mechanisms. ASFV and EhV are both internalized by cells via macropinocytosis or phagocytosis. Macropinocytosis is an important endocytic route used by several viruses to enter host cells (FIG. 3). It is defined as an actin dependent endocytic process associated with a vigorous plasma membrane activity in the form of ruffles or blebs. This pathway involves receptor-independent internalization of fluid or solutes into large uncoated vesicles sized between 0.5-10 mm called macropinosomes. Both enveloped EhV-86 and ASFV exit by viral budding.

Thus, in some embodiments in which the megavirus being monitored using the surrogate assay is African swine fever virus (ASFV), EhV can be the surrogate virus used in the surrogate assay. While described herein in the context of an exemplary embodiment in which EhV is a surrogate virus for ASFV, the assay methods described herein can be any suitable virus that is a suitable proxy for the virus being monitored. Exemplary alternative surrogate viruses for ASFV include, for example, phaeoviruses, algal viruses of the genus *Pheovirus* that are morphologically and genetically similar to EhV.

Generally, an alternative surrogate virus is morphologically similar to the virus for which it is a surrogate. Also, the surrogate virus and the virus being monitored should react similarly to virus-inactivating treatments. In some cases, the surrogate virus does not infect humans or animals. In some cases, the surrogate virus will not produce any substance (e.g., a toxin) that causes an undesirable biological effect or interacts in a deleterious manner with the livestock to which the animal feed is to be provided or with humans.

There is significant variability in the survival of, for example, porcine viruses in feed ingredients and complete feed. In some feed ingredients, the viruses survive for extended periods of time (e.g., soybean meal), but in others (e.g., complete feed), they are rapidly inactivated or survive for a short time. This variability implies that the feed characteristics (e.g., processing temperature, water activity, pH, salinity) affect virus survival, leading to some feed ingredients being at greater risk of viral transmission. However, to date, this information has been collected by testing survival in vitro. Due to the high risk associated with these highly contagious and infectious viruses, no real-world in situ data exists. The current in vitro empirical approach of determining at risk feed testing combinations of viruses and feed is unsustainable due to the magnitude of virus and feed ingredient combinations. The surrogate virus assays described herein provide a platform for evaluating practical solutions feed mills can use to ameliorate 'risk' of transmitting ASFV and other megaviruses.

As discussed above, ASFV and EhV enter and exit their cellular hosts by similar mechanisms. Treatments that damage the physiology of the virion and/or the genome of the virus, rendering the virus permanently disabled (i.e., even if macropinocytosis still internalizes the megavirus, virus will not replicate), can be analyzed to determine their efficacy inactivating the megavirus.

In general, non-enveloped viruses tend to be more resistant to heat than enveloped viruses. For example, ASFV is stable at room temperatures, but when exposed to 65° C., it is fully inactivated within one minute of treatment. Temperatures above 80° C. have been reported to inactivate some enveloped viruses even after short periods of time (<1 s). For example, 4 $\log_{10}$ of porcine reproductive and respiratory syndrome (PRRS) virus, a +ssRNA virus, was inactivated by spray-drying at 90° C. (outlet temperature) for 0.41 seconds. Observations from Minnesota Veterinary Diagnostic Lab (MVDL) suggest that temperature has a curvilinear effect on inactivation of porcine epidemic diarrhea virus (PEDV), with sustained survival at 120° C., but rapid inactivation at 145° C. There are diverse methods of feed ingredient manufacturing with different temperatures and heating time (e.g., processing of soybeans (100° C.; 15 minutes), pelleting (70-90° C., 5-10 seconds), extrusion (90-110° C., 10 seconds), among others. While these conditions inactivate viruses, contamination of feed ingredients after these procedures is highly probable due to the magnitude of global feed ingredient production and complexity of the supply chain. Thus, validated and verifiable practical virus elimination solutions will be needed at the point of finished feed production.

Citric acid (2%) is recommended as a disinfectant for ASFV contaminated surfaces. As much as $10^6$ $CCID_{50}$/mL of virus, when applied to wood surfaces, were completely inactivated after 30 minutes of washing the surface with 2% citric acid. Citric acid is also an acceptable feed ingredient for use in swine feeds.

Adding 0.05% salt to a corn-soybean meal-based diet inactivated 1 log of PEDV within 11.4 days rather than 17.2 days taken without salt. Likewise, survival of swine viruses was less in complete feed than individual feed ingredients. These observations suggest that salinity may modify properties of feed that decrease virus survival.

The surrogate virus assay can be used to measure the effect of temperature, citric acid, salinity, and/or other physical or chemical treatment on the inactivation kinetics of a megavirus, such as, for example, ASFV and/an ASFV-like surrogate megavirus (e.g., EhV) in feed or in a feed ingredient. Complete swine feed can be spiked with EhV. Five temperatures ranging from 0° C. to 70° C., seven citric acid percentages ranging from 0% to 3%, and seven salinity percentages 0% to 3% can be tested.

Figure 4A:
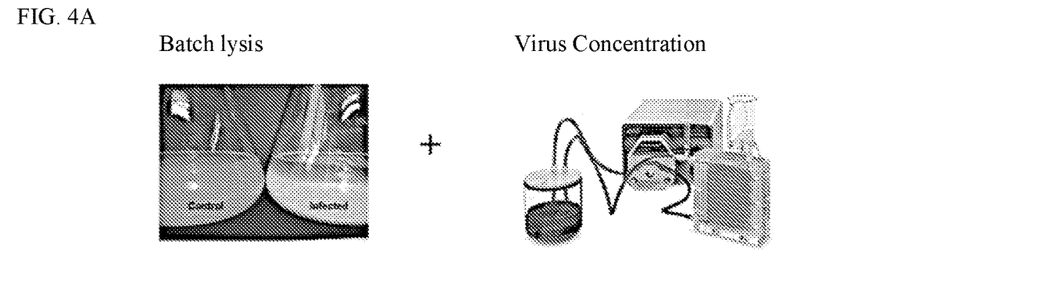
Figure 4B:
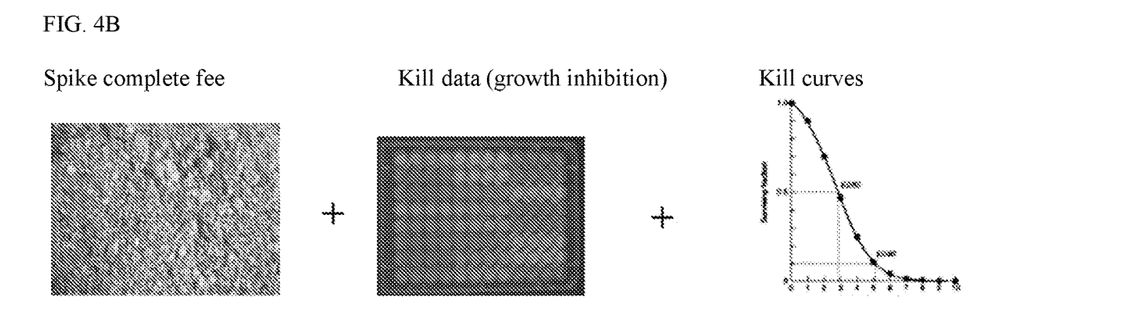
Figure 4C:
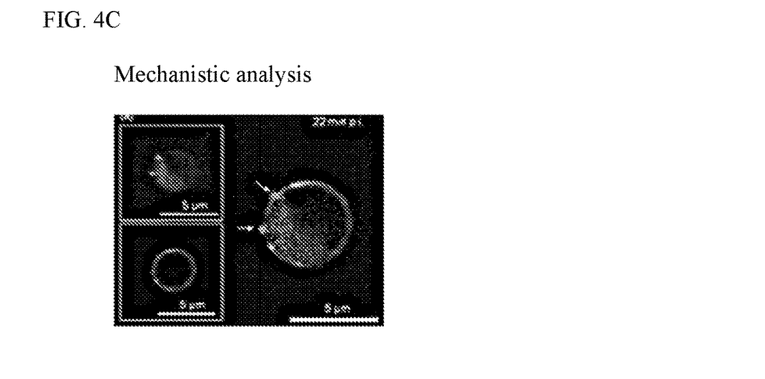
Figure 4D:
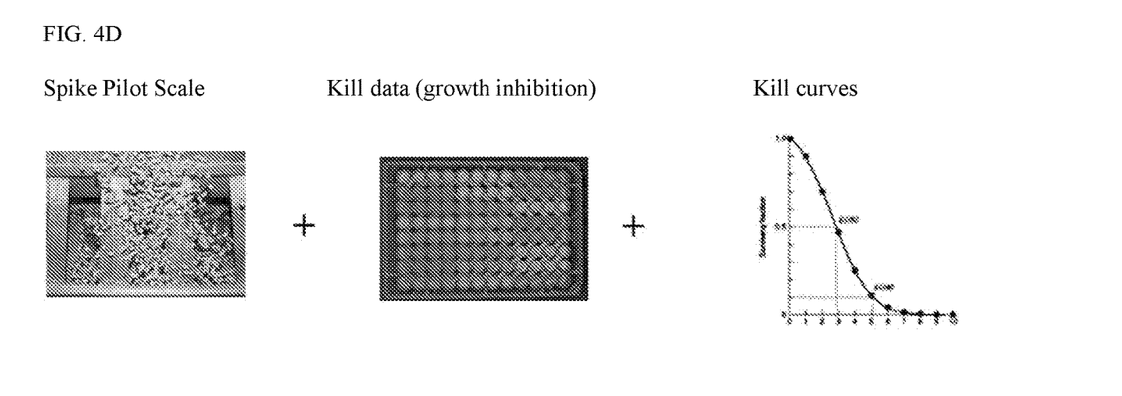

Accurate virus inactivation requires understanding of how feed treatment processes (e.g., temperature, citric acid, salinity) interact with viral physiology. FIG. 4 illustrates a four-step process that includes growing the virus (FIG. 4A), spiking complete feed with the virus and applying viral inactivation treatments, while determining the impact of the inactivation treatment on the ability of the virus to kill algal cells (FIG. 4B), characterize the mechanisms of inactivation (FIG. 4C), and apply the assay in situ in a formulation facility (FIG. 4D).

The surrogate virus assay also can be used to characterize the mechanism of megavirus inactivation in feed by monitoring the cellular infection cycle of a megavirus surrogate virus (e.g., EhV as a surrogate for ASFV) in vitro. For example, ASFV-like megaviruses use a non-selective infection method of cellular entry through a process called macropinocytosis. Application of epi-fluorescence microscopy combined with real-time PCR or RT-PCR allow one to identify treatments that damage the physiology and/or genome of the virus, thereby rendering the virus permanently inactivated.

Finally, the surrogate virus assay can be used as a surveillance assay, providing real-world in situ data on the effectiveness of treatments in reducing—even eliminating—a megavirus from complete feed produced at scale. The assay may be employed post-production in a feed mill. The assay also may be employed before feed is stored or transported to ensure that the feed being distributed is safe for livestock consumption. In addition, or alternatively, the assay may be performed after storage and/or transport to ensure that the feed being received is safe for livestock consumption.

Thus, the predetermined period of time can include or correspond to a period of time typical of transporting an animal feed ingredient or animal feed. As used herein, the term "correspond to a period of time . . . " refers to a period of time typical of the action, but without requiring the named action. For example, if transportation of an animal feed ingredient typically takes 12 hours, a period of time that corresponds to transport of an animal feed ingredient is twelve hours, even if the animal feed ingredient is not transported during that time.

Thus, the predetermined period of time may include or correspond to the period of time typical for transporting a feed ingredient to a feed mill and/or a period typical for transporting animal feed from a feed mill to a user. Alternatively, or additionally, the predetermined period of time can include or correspond to a period of time typical of storing the animal feed or animal feed ingredient. Thus, the predetermined period of time may include or correspond to a period of time typical of storing an animal feed ingredient before transporting the ingredient to a feed mill, a period of time typical of storing an animal feed ingredient at a feed mill before being processed into complete animal feed, a period of time typical of storing complete animal feed at a feed mill prior to transporting the animal feed to a distributor or user, a period of time typical of storing the animal feed by a distributor or user until consumed by livestock, and/or a period of time after the product (either the animal feed ingredient or the complete animal feed) is confirmed to be virus free.

Thus, the predetermined period of time for a given application may be hours to years in duration. In some embodiments, therefore, the predetermined period of time may be a minimum of at least two hours, at least twelve hours, at least 24 hours, at least seven days, at least 30 days, or at least two months. In some embodiments, the predetermined period of time may be a maximum of no more than five years, no more than two years, no more than one year, no more than six months, no more than two months, no more than one month, no more than two weeks, no more than one week, no more than one day, or no more than 12 hours. In some embodiments, the predetermined period of time may be expressed as a range having as endpoints any minimum period of time listed above and any maximum period of time listed above that is greater than the minimum period of time. For example, the predetermined period of time may be from two hours to one week, from 24 hours to six months, from two months to five years, etc.

In the preceding description and following claims, the term "and/or" means one or all of the listed elements or a combination of any two or more of the listed elements; the terms "comprises," "comprising," and variations thereof are to be construed as open ended—i.e., additional elements or steps are optional and may or may not be present; unless otherwise specified, "a," "an," "the," and "at least one" are used interchangeably and mean one or more than one; and the recitations of numerical ranges by endpoints include all numbers subsumed within that range (e.g., 1 to 5 includes 1, 1.5, 2, 2.75, 3, 3.80, 4, 5, etc.).

In the preceding description, particular embodiments may be described in isolation for clarity. Unless otherwise expressly specified that the features of a particular embodiment are incompatible with the features of another embodiment, certain embodiments can include a combination of compatible features described herein in connection with one or more embodiments.

For any method disclosed herein that includes discrete steps, the steps may be conducted in any feasible order. And, as appropriate, any combination of two or more steps may be conducted simultaneously.

The present invention is illustrated by the following examples. It is to be understood that the particular examples, materials, amounts, and procedures are to be interpreted broadly in accordance with the scope and spirit of the invention as set forth herein.

EXAMPLES

Example 1

Complete swine feed is spiked with EhV.

Five temperatures ranging from 0° C. to 70° C., seven citric acid percentages ranging from 0% to 3%, and seven salinity percentages 0% to 3% are tested as described below.

A stock culture of *E. huxleyi* CCMP 1516 (National Center for Marine Algae and Microbiota, Bigelow Laboratory for Ocean Sciences, East Boothbay, ME) is maintained in exponential growth, infected with an EhV-86 stock, lysed and filtered, and concentrated using tangential filtration as previously described (Schroeder et al., 2002, *Archives of Virology* 147:1685-1698). Virus concentration is calculated by analytical flow cytometry using SYBR Green I and/or epifluorescence microscopy using DAPI dilactate (Sigma-Aldrich, St. Louis, MO). The concentrate serves as the inoculum for the inactivation assays.

Commercial feed samples are spiked with EhV-86, the surrogate virus, to obtain a final minimum spike load $10^4$ EhV per mg of whole feed/feed components/supplements/mitigants. The amount of liquid needed to spike the feed is miniscule and does not alter the properties of the feed. Alternatively, or in addition to, solid whole feed or components or supplements or mitigants can be suspended in a liquid media (for example sterile water or culture media). The surrogate virus can then be added to this liquid medium at a final minimum load of $10^4$ EhV per ml. An inactivation grid, replicated in 96-well or larger equivalent assay containers can be used for treatment purposes. Treatments such citric acid (0%-3% w/w) and/or NaCl (0%-3% w/w) can be applied. These containers are then be incubated at various temperatures conditions (ambient and, e.g., 40° C.-140° C., chosen based on the temperature ranges used in the feed or similar production systems) in a pre-heated oven for various periods of time and left to cool to ambient temperature. Subsamples are inoculated directly into multi-well or larger volume *E. huxleyi* culture vessels. Inhibition of cell growth (cell counts) and virus production (virus counts) is monitored daily over six to ten days and kill curve plots are generated.

Example 2

Control and treated EhV are extracted from feed, stained, and viewed with epifluorescence microscopy as previously described (Mackinder et al., 2009, *J Gen Virol* 90:2306-2316; Schroeder et al., 2002, *Archives of Virology* 147:1685-1698). Similarly, both stained host and virus are mixed briefly to give an approximate ratio of 10 virus particles per cell. The virus-host mixture is viewed either immediately or after incubation for 30 minutes at 15° C. Real time RT-PCR is used to detect if the virus is transcriptionally active as previously described (Wilson et al., 2005, *Science* 309 (5737):1090-1092).

Example 3

In situ inactivation of EhV is tested in a feed mill by spiking one ingredient of the complete feed prior to feed processing. One to three optimal treatments (as described in Example 1) is used to inactivate the virus on site. The resultant treated complete feed is evaluated as described in Example 1 and Example 2.

The complete disclosure of all patents, patent applications, and publications, and electronically available material cited herein are incorporated by reference in their entirety. In the event that any inconsistency exists between the disclosure of the present application and the disclosures of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A method for monitoring the presence or absence of African swine fever virus (ASFV) in animal feed or an animal feed ingredient, the method comprising:
   inoculating the animal feed or animal feed ingredient with an ASFV surrogate virus, *Emiliania huxleyi* virus (EhV), as a proxy for the ASFV;
   subjecting the animal feed or animal feed ingredient to a treatment that inactivates the ASFV and the EhV;
   waiting a predetermined period of time; and
   determining the presence or absence of the EhV in the animal feed or animal feed ingredient, thereby monitoring the presence or absence of the ASFV in the animal feed or animal feed ingredient.

2. The method of claim 1, wherein the treatment that inactivates ASFV and the EhV comprises exposure to a temperature of at least 65° C. for at least one minute, exposure to a temperature of at least 85° C. for at least one second, exposure to citric acid, or exposure to increased salinity.

3. The method of claim 1, wherein the predetermined period of time comprises the time it takes to transport of the animal feed or animal feed ingredient from a supplier to a user.

4. The method of claim 1, further comprising determining that the animal feed or animal feed ingredient is safe for livestock if no EhV is detected.

5. The method of claim 1, further comprising determining that the treatment is effective to inactivate the ASFV for the predetermined period of time if no EhV is detected.

6. A method for monitoring the presence or absence of African swine fever virus (ASFV) in an animal product, the method comprising:

inoculating the animal product with an ASFV surrogate virus, *Emiliania huxleyi* virus (EhV), as a proxy for the ASFV;

subjecting the animal product to a treatment that inactivates the ASFV and the EhV;

waiting a predetermined period of time; and determining the presence or absence of the EhV in the animal product, thereby monitoring the presence or absence of the ASFV in the animal product.

7. The method of claim 1, wherein the predetermined period of time is at least seven days.

8. The method of claim 1, wherein the predetermined period of time is at least 30 days.

9. The method of claim 6, wherein the treatment that inactivates ASFV and EhV comprises exposure to a temperature of at least 65° C. for at least one minute, exposure to a temperature of at least 85° C. for at least one second, exposure to citric acid, or exposure to increased salinity.

10. The method of claim 6, wherein the predetermined period of time comprises the time it takes to transport the animal feed or animal feed ingredient from a supplier to a user.

11. The method of claim 6, further comprising determining that the animal feed or animal feed ingredient is safe for livestock if no EhV is detected.

12. The method of claim 6, further comprising determining that the treatment is effective to inactivate the ASFV for the predetermined period of time if no EhV is detected.

13. The method of claim 6, wherein the predetermined period of time is at least seven days.

14. The method of claim 6, wherein the predetermined period of time is at least 30 days.

* * * * *